United States Patent Office 3,105,060
Patented Sept. 24, 1963

---

3,105,060
MICROBIOCIDAL RESINOUS COMPOSITIONS
James N. Schramm and Paul A. Wolf, Midland, Mich., assignors to The Dow Chemical Company, Midland, Mich., a corporation of Delaware
No Drawing. Filed Sept. 22, 1961, Ser. No. 139,833
4 Claims. (Cl. 260—45.75)

This invention relates to resinous polyolefin compositions having bactericidal properties. More specifically it relates to compositions of polyethylene that display marked antibacterial and antifungal characteristics.

In general, resinous materials such as polyolefins are inert to microbial and fungal attack. Nevertheless, they readily act as carriers for microorganisms and can thus be a source of contamination or infection. Furthermore, despite this inertness, the surface of articles fabricated from these resinous materials may easily be contaminated with materials that function as nutrients for the microorganisms so that growth of the latter can occur on such surfaces. Beside thus being a continuing source of contamination, the articles may themselves be discolored by products of metabolism of the microorganisms and additionally give rise to objectionable odors.

It is obviously desirable that, for certain applications, articles made of these resinous materials, such as shower curtains, should have the minimum property of inhibiting the growth of microorganisms that may be resident on them. Preferably, such articles should possess the ability to destroy microorganisms that come into contact with their surfaces.

A variety of materials have been proposed for incorporation into resinous materials with a view to rendering them bacteriostatic. Most of these suffer from the disadvantage that they are relatively fugitive; their effectiveness is of limited duration. Furthermore, the resinous products containing these materials generally exhibit an inhibitory effect only. Finally, many must be used in relatively large concentration as, for example, 2 to 4 percent by weight of the resin in which they are contained. This is ordinarily objectionable both from the viewpoint of cost and because excessive amounts of the bacteriostat may adversely effect the color or the physical properties of the resin.

Accordingly, it is an object of the present invention to provide compositions of polyolefins that are possessed of bactericidal properties. It is a further object to provide such compositions in which the bactericidal property is relatively long-lived. It is an additional object to achieve this property in polyolefin compositions without adverse effect on the color or the physical properties of the compositions. The attainment of these and other objects of the invention will be apparent from the description and examples to follow.

It has been discovered that the incorporation into polyolefin compositions of small amounts of a 10-halophenoxarsine is effective to provide the compositions with excellent anti-bacterial and anti-fungal properties. Against such representative organisms as *Staphylococcus aureus, Salmonella typhosa, Bacillus subtilis* and *Aspergillus terreus* the compositions display a completely microbiocidal effect rather than merely causing inhibition of their growth. Accordingly, even when contaminated with material of nutritive value for these organisms, the surface of articles made from the compositions are essentially sterile.

As above indicated, relatively small amounts of the bactericidal component of the resinous compositions are efficient to produce the desired effect. Advantageously the 10-halophenoxarsine may represent from about 0.05 to about 0.1 percent of the weight of the composition incorporating it. Preferably, it will be employed in an amount ranging from about 0.05 to about 0.075 percent of that weight.

The bactericidal component is readily incorporated into the resinous component by known compounding techniques, as by being added to the resin or a two roll mill. Advantageously, it may be introduced through a side port of an extruder in a pelletizing operation.

Resinous compositions containing the bactericidal component of the present invention may optionally also contain additional compounding ingredients such as fillers, pigments, antioxidants and the like.

In the following non-limiting examples, illustrative of the invention, all parts and percentages are on a weight basis.

EXAMPLE 1

On a two-roll mill 299.7 parts of polyethylene were fused at about 260° F. to give a smooth blanket of material on the rolls. To this blanket there was gradually added 0.3 part of 10-chlorophenoxarsine. Milling was continued until the added material was evenly dispersed in the polyethylene, after which the composition was stripped from the rolls and allowed to cool. Portions of the composition were then compression molded at 350° F. to give samples measuring 6″ x 6″ x 0.125″. From these samples, test plates measuring 1″ x 1″ were cut. Half of these samples were aged for one month at room temperature. The remainder were aged for the same period at a temperature of 125° F.

A test plate was placed on each of several nutrient agar surfaces in petri dishes, each agar surface having previously been inoculated with a selected microorganism. The petri dishes were covered and incubated for 48 hours at a temperature of 30° C. for fungi and at a temperature of 37° C. for bacteria. At the end of this period the clear zone indicating inhibition of growth extending outwardly from the test plates was measured. The results are given below in Table I, which also gives the results of subcultures from the test plates, determined as follows.

A drop of inoculum of the microorganism was placed on the surface of a test plate. The sample was placed in a petri dish, covered and incubated for 24 hours at either 30° C. or 37° C. depending, as shown above, on the nature of the microorganism. A sterile swab was then first wiped over the plate and then over the appropriate nutrient substrate for the microorganism. This was then incubated for 48 hours and examined for evidence of growth.

*Table I*

| Sample History | Organism | Zone of Inhibition (mm.) | Subculture Growth |
|---|---|---|---|
| Aged 1 mo., RT | S. aureus | 15–16 | 0 |
| Do | S. typhosa | 6–7 | 0 |
| Do | Asp. terreus | 30 | 0 |
| Aged 1 mo., 125° F | S. aureus | 14–15 | 0 |
| Do | S. typhosa | 3–5 | 0 |
| Do | Asp. terreus | 25–28 | 0 |

EXAMPLE 2

A composition was prepared as in Example 1 employing 299.85 parts of polyethylene and 0.15 part of 10-chlorophenoxarsine. The microbiocidal activity of the composition is evident from an inspection of Table II, below.

Table II

| Sample History | Organism | Zone of Inhibition (mm.) | Subculture Growth |
|---|---|---|---|
| Aged 1 mo., RT | S. aureus | 13-14 | 0 |
| Do | Asp. terreus | 16-18 | 0 |
| Do | B. subtilis | 16-18 | 0 |
| Aged 2 mo., RT | S. aureus | 11-12 | 0 |
| Do | Asp. terreus | 17-18 | 0 |
| Do | B. subtilis | 11-13 | 0 |
| Aged 2 mo., 125° F | S. aureus | 8-9 | 0 |
| Do | Asp. terreus | 11-13 | 0 |
| Do | B. subtilis | 9-10 | 0 |

What is claimed is:

1. A composition of matter comprising a uniform admixture of a thermoplastic polyolefin resin and a microbiocidal amount of a 10-halophenoxarsine.

2. A composition of matter comprising a uniform admixture of polyethylene and a microbiocidal amount of a 10-halophenoxarsine.

3. A composition of matter comprising a uniform admixture of polyethylene and from about 0.05 to about 0.1 percent, based on the total weight of the said admixture, of a 10-halophenoxarsine.

4. A composition of matter comprising a uniform admixture of polyethylene and from about 0.05 to about 0.1 percent, based on the total weight of the said admixture, of 10-chlorophenoxarsine.

References Cited in the file of this patent

UNITED STATES PATENTS

| 2,491,287 | Smith et al. | Dec. 13, 1949 |
| 2,919,200 | Dubin et al. | Dec. 29, 1959 |

FOREIGN PATENTS

| 32-6400 | Japan | 1957 |